United States Patent [19]
Crockett

[11] Patent Number: 5,509,453
[45] Date of Patent: Apr. 23, 1996

[54] APPARATUS FOR REMOVING TREES

[76] Inventor: Foy Crockett, Rte. 1, Box 193, Hugo, Okla. 74743-9725

[21] Appl. No.: 415,560

[22] Filed: Apr. 3, 1995

[51] Int. Cl.$^6$ .................................................. A01G 23/08
[52] U.S. Cl. ..................... 144/34 R; 144/92; 144/34 A; 144/218; 144/336; 30/379.5; 83/928; 408/53
[58] Field of Search ................... 30/379, 379.5; 83/928; 144/3 D, 34 R, 34 A, 218, 241, 336; 241/101.76; 408/42, 52, 53, 85

[56] References Cited

U.S. PATENT DOCUMENTS

| | | | |
|---|---|---|---|
| 115 | 1/1837 | Power | 408/42 X |
| 90,834 | 6/1869 | Fory . | |
| 513,088 | 1/1894 | Crane | 408/53 |
| 651,315 | 6/1900 | Schurman | 408/53 |
| 658,782 | 10/1900 | Kellogg | 408/53 |
| 790,823 | 5/1905 | Garfield | 408/42 |
| 1,460,617 | 7/1923 | Steem et al. | 144/2 N |
| 1,675,413 | 7/1928 | Johnson | 144/2 N UX |
| 2,462,314 | 2/1949 | Fuqua . | |
| 2,619,129 | 11/1952 | Hines . | |
| 2,689,131 | 9/1954 | Priest | 144/241 UX |
| 2,713,363 | 7/1955 | Ryals . | |
| 2,787,298 | 4/1957 | Tourneau . | |
| 3,911,979 | 10/1975 | Rousseau | 144/2 N |
| 4,090,540 | 5/1978 | Smith . | |

*Primary Examiner*—W. Donald Bray
*Attorney, Agent, or Firm*—Dougherty, Hessin, Beavers & Gilbert

[57] ABSTRACT

Apparatus for severing trees, brush, and other forestry at or below ground level in one passage of the apparatus through the forestry includes a plurality of rotatable shafts; a shaft housing for rotatably supporting the shafts with the rotational axes of the shafts juxtaposed and the first ends of the shafts about transversely aligned; a cutting bit connected at the first end of each shaft, each bit having cutting blades which overlap with the blades of the adjacent bits so that the bits cut a continuous, unbroken swath; a rotary power source connected to the shafts for rotating the shafts; a frame for supporting the shaft support; and a vertical actuator, connected between the frame and the shaft housing, for selectably adjusting the elevation of the shaft housing between an elevation at or below ground level to an elevation above ground level.

17 Claims, 8 Drawing Sheets

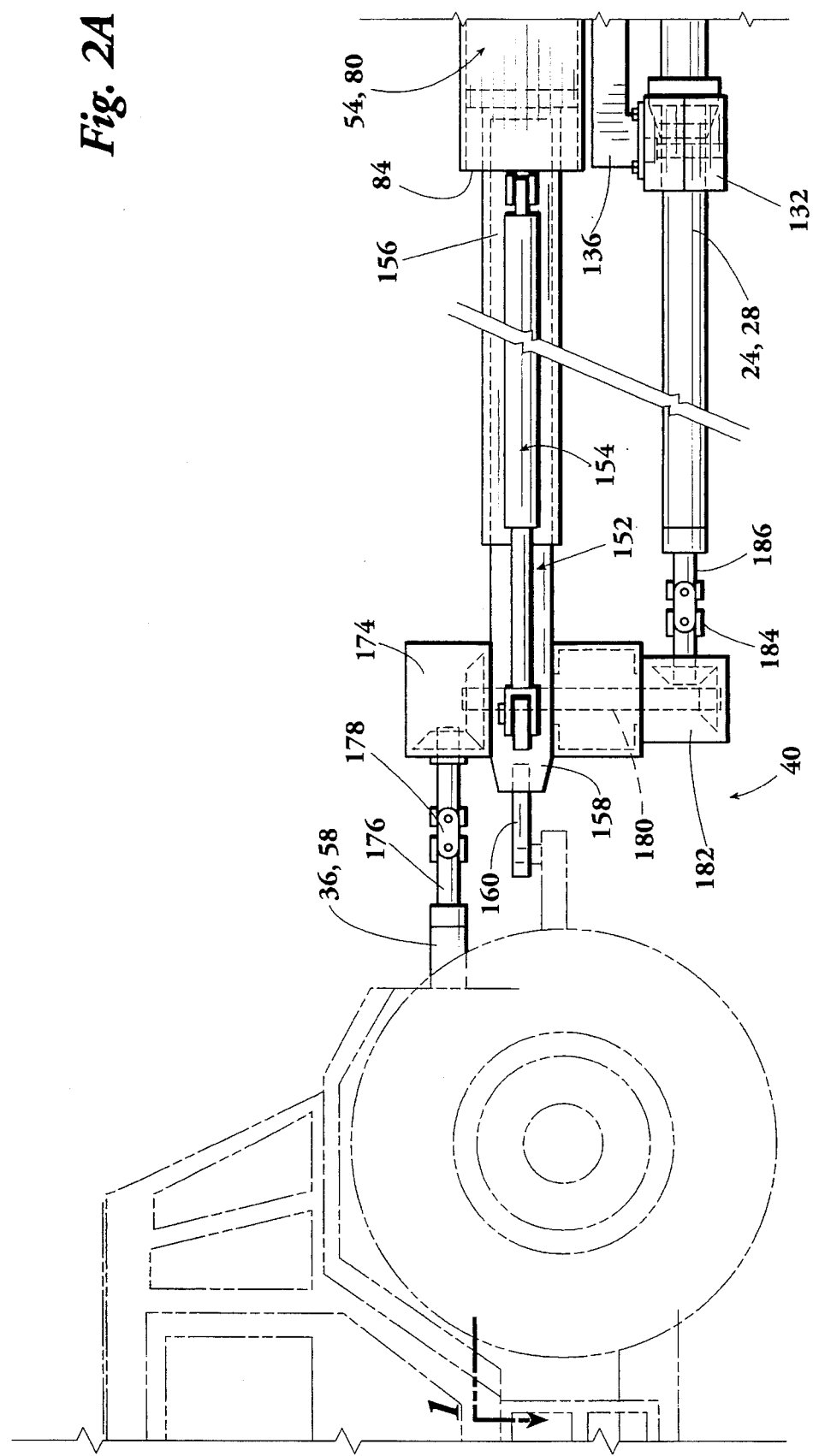

APPARATUS FOR REMOVING TREES

BACKGROUND OF THE INVENTION

This invention relates to apparatus for removing trees and more particularly, but not by way of limitation, relates to apparatus for severing trees, brush, and other forestry at or below ground level.

Apparatus for cutting trees and clearing land of trees and brush are known. For example, U.S. Pat. Nos. 2,462,314; 2,619,129; 2,713,363; 2,787,298; and 4,090,540 disclose various types of circular saws which may be connected to tractors or the like for cutting trees. U.S. Pat. No. 4,090,540 discloses such a circular saw and asserts that the circular saw may be used to sever a tree along a slanting plane below ground level.

There are numerous problems with the use of circular saws in clearing trees, brush, and other forestry from land. Circular saws operate at high speeds and are dangerous in that it is virtually impossible to surround them with an effective guard. Circular saws wear quickly and the cutting teeth are easily broken, particularly if the blade encounters the rocks and other hard minerals to be expected at or below ground level. Circular saws also get very hot when in use and warp easily if they are placed in a bind by the tree being cut, as commonly occurs. When a circular blade is damaged, the entire blade must normally be replaced, which is extremely difficult, if not impossible to do in the field. Therefore, the use of circular saws requires costly down time to return to the shop for the circular saw blade. These problems are greatly exacerbated by the dirt, rock, minerals, roots, etc. encountered when attempting to cut forestry below ground level.

U.S. Pat. No. 90,834 (Fory) discloses an apparatus for felling trees having a series of augers which revolve on a carriage. Fory will not fell a tree in one passage through the tree, but, to the contrary, discloses making multiple passes through the tree and then using an axe to cause the tree to fall. Further, Fory does not disclose cutting a tree at or below ground level. In fact, the frame A and arms B which are used to hold the augers against the tree for drilling, grip the tree below the augers and prevent the apparatus from being lowered sufficiently to cut the tree near ground level.

Because of the problems of the prior tree cutting devices, such as those discussed above, the most common method currently used in clearing land of trees and forestry is the use of bulldozers. The use of bulldozers themselves is extremely expensive, and creates even more expense, in that the bulldozer pushes a tree and its roots over which often brings tons of rock to the surface. This rock has to be cleared from the land and often must be relocated, which is a time consuming, expensive procedure.

Therefore, there is a need for an apparatus which may be used to sever trees, brush, and related forestry at or below ground level without using circular saw blades, in one passage of the apparatus through the forestry, and without disturbing the subterranean earth around the forestry.

SUMMARY OF THE INVENTION

The present invention is contemplated as overcoming the foregoing deficiencies and meeting the above-described needs. In accomplishing this, the present invention provides a novel and improved apparatus for cutting trees, brush, and other forestry.

The inventive apparatus includes a plurality of rotatable shafts having a first end and a second end; a plurality of cutting bits, a cutting bit connected at the first end of each shaft with each cutting bit having a cutting diameter larger than the diameter of the shaft to which the bit is connected; a shaft housing for rotatably supporting the shafts with the rotational axes of the shafts juxtaposed; and a rotary power source for rotating the shafts. Preferably, the bits include radially extending cutting blades. The blades of adjacent bits overlap so that the bits cut a continuous, unbroken swath and sever forestry above the shafts in one passage of the bits through the forestry. More preferably, the blades extend radially from the shafts beyond the surfaces of the shaft housing so that the shaft housing will enter the swath cut by the bits.

The apparatus includes a frame connected to the shaft housing for supporting the shaft housing; and a vertical actuator, connected between the frame and the shaft housing, for selectably adjusting the elevation of the shaft housing and shafts. A deflector may be connected to the frame and extended toward the first ends of the shafts for contacting forestry being cut by the bits and deflecting the forestry away from the apparatus as the bits cut through the forestry. The preferred deflector includes a telescopable support arm and a deflector actuator for extending and retracting the support arm relative to second end and to the bits. A propulsion source, such as a motor-driven vehicle, may be connected to the frame, for forcing the cutting bits and shafts through forestry to be cut.

BRIEF DESCRIPTION OF THE DRAWINGS

The present invention will be better understood by reference to the example of the following drawings:

FIGS. 2A and 2B are a side elevation view of an embodiment of the apparatus of the present invention taken along line 2—2 of FIGS. 1A and 1B.

DETAILED DESCRIPTION OF THE PREFERRED EMBODIMENTS

Figure 1A:
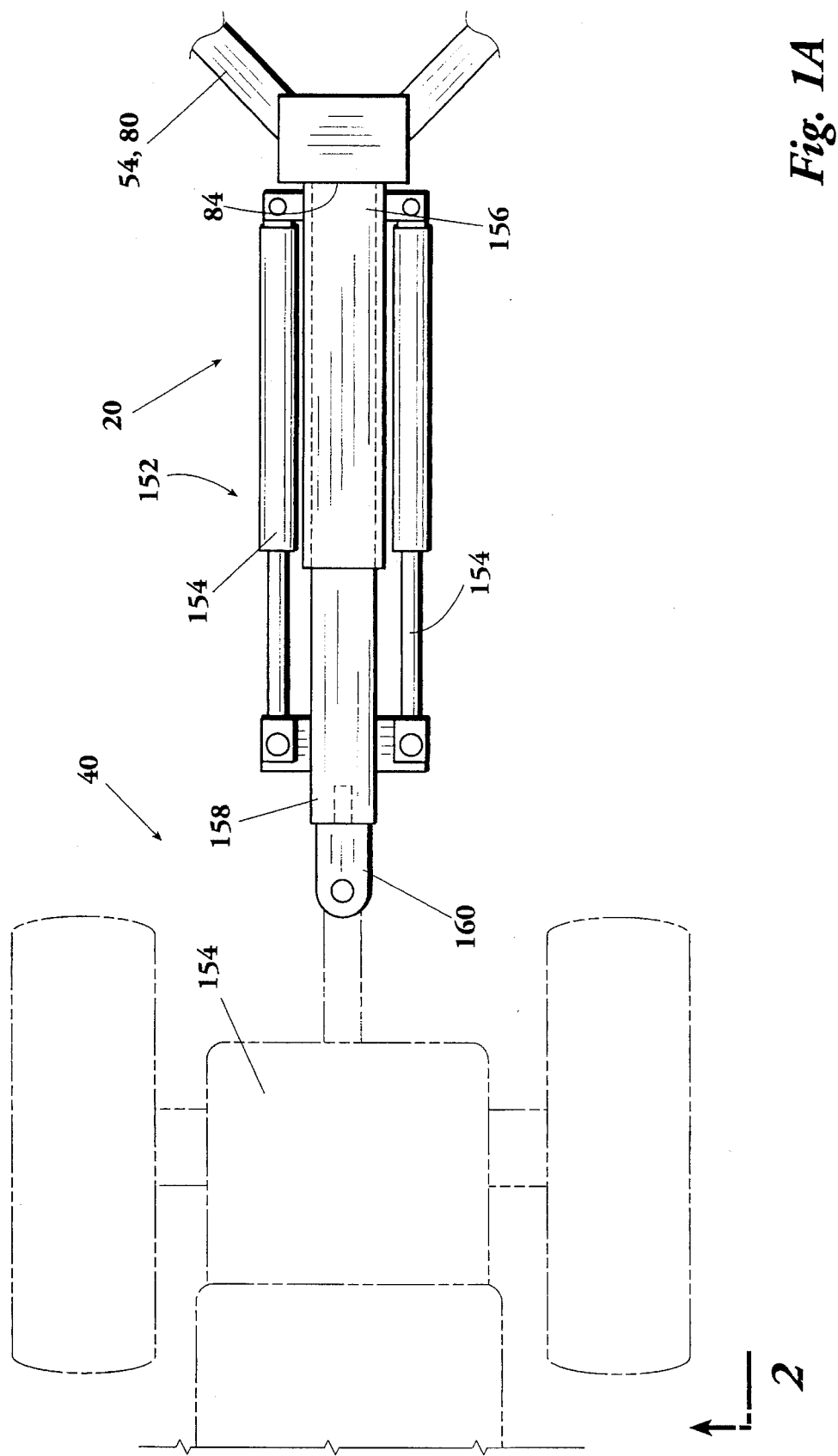
FIGS. 1A and 1B are a top plan view of an embodiment of the apparatus of the present invention taken along line 1—1 of FIGS. 2A and 2B.

The preferred embodiments of the invention will now be described with reference to the drawings. Like reference characters refer to like or corresponding parts throughout the drawings and description.

FIGS. 1–6 present embodiments of the apparatus of the present invention, generally designated 20, for cutting or severing trees, brush, and other forestry or vegetation at or below ground level. Although the preferred embodiment is used for severing trees, brush, and other forestry or vegetation (hereinafter collectively referred to as "forestry") at or below ground level in one passage of the apparatus through the forestry, it is intended to be understood that the invention may be adapted to cutting trees and clearing forestry from land in other manners. The apparatus 20 may also be easily sized and adapted for cleaning forestry between the fence posts of a barbed wire fence or the like.

Figure 1B:
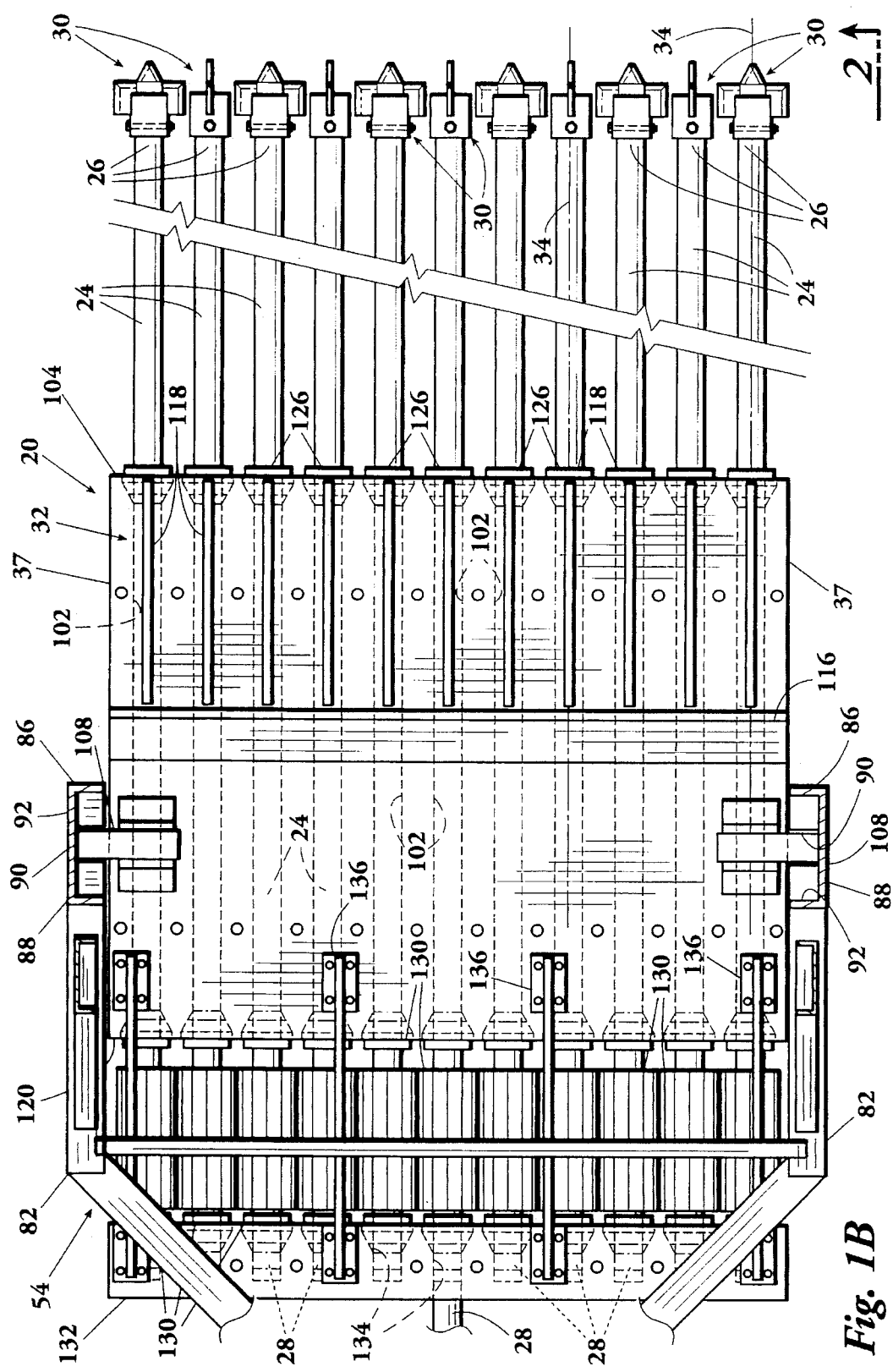

Referring to the example of FIG. 1B, the apparatus may be generally described as including a plurality of rotatable shafts 24 having a first end 26 and a second end 28; a plurality of cutting bits 30 with a cutting bit 30 being connected at the first end 26 of each shaft 24; a shaft housing 32 for rotatably supporting the shafts with the rotational axes 34 of the shafts 24 juxtaposed; and a rotary power source 36 for rotating the shafts 24.

Figure 3:
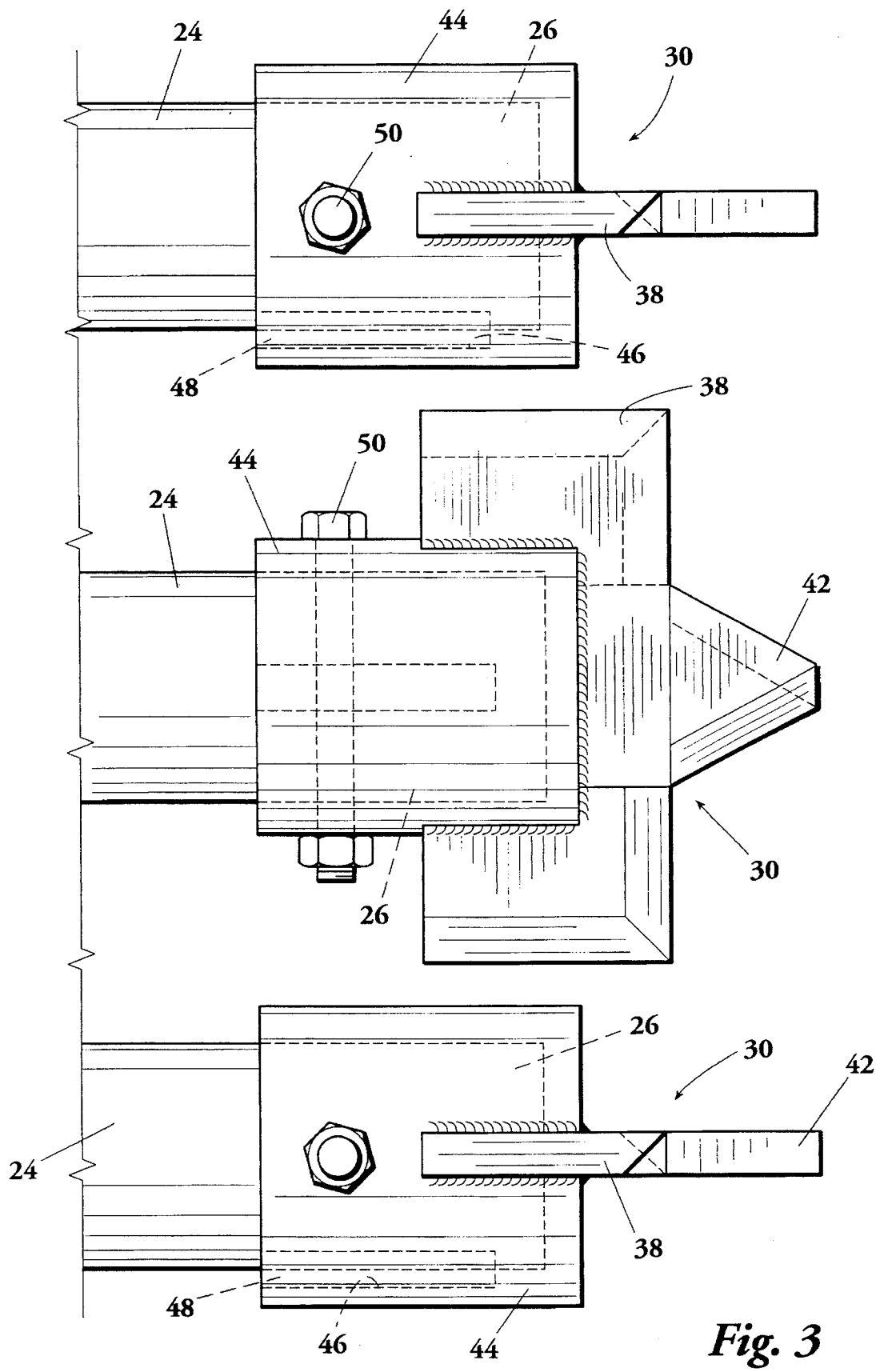
FIG. 3 is an enlarged top view of an embodiment of the cutting bits used with the present invention.
Figure 4:
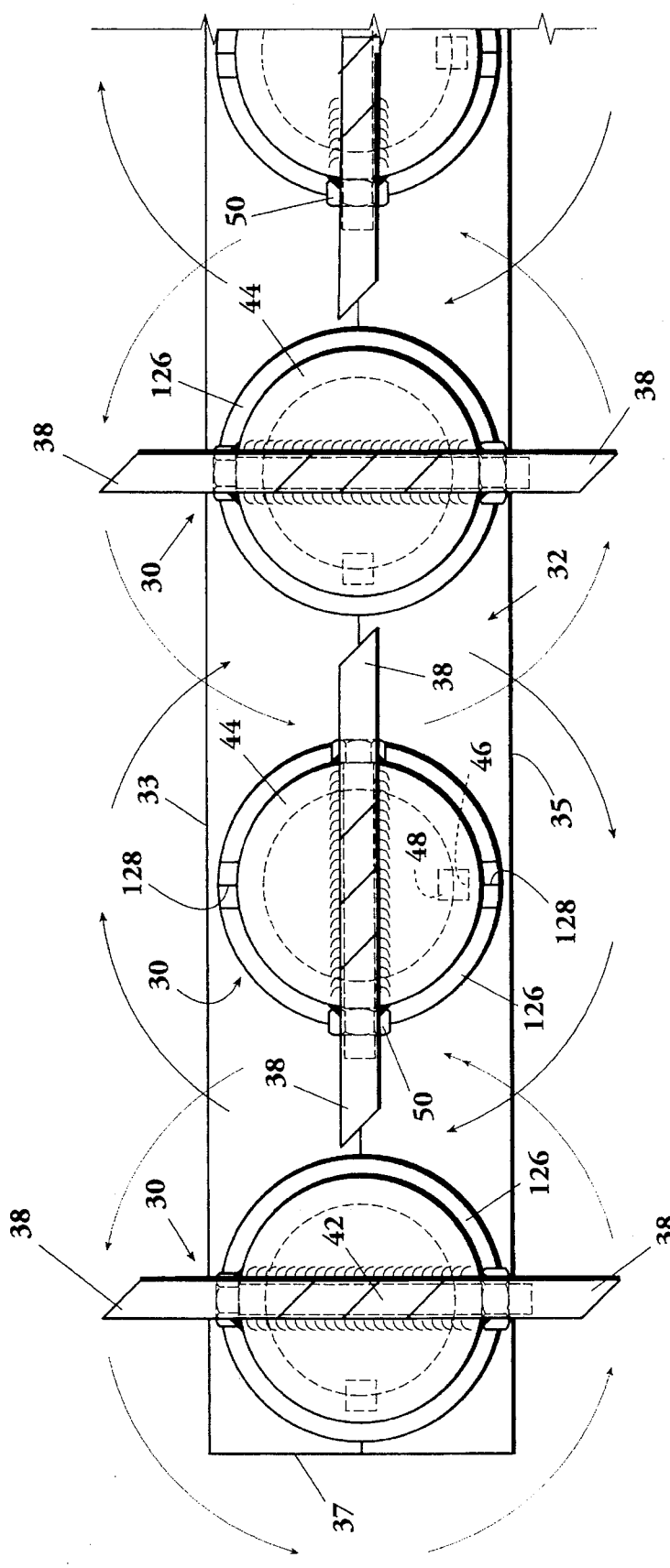
FIG. 4 is an end view of the cutting bits of FIG. 3.

Preferably, referring to example FIGS. 3 and 4, each cutting bit 30 has a cutting diameter larger than the diameter of the shaft 24 to which the bit 30 is connected so that each bit 30 cuts a bore, or bore hole, through the forestry having a diameter larger than the shaft 24. More preferably, the bits include radially extending cutting blades 38. The blades 38, which define the cutting diameter of the bits 30, overlap so that the bits 30 cut a continuous, unbroken swath or slot through the forestry and sever the forestry above the shafts 24 in one passage of the bits 30. Normally, the apparatus 20 will be adjusted so that the bits are cutting at or below ground level and so that the overlapping bits 30 will sever the forestry at or just below ground level.

Referring to the example of FIG. 4, the preferred blades 38 extend radially from the shafts 24 beyond the surfaces of the shaft housing 32 so that the shaft housing 32 may enter the swath cut by the bits 30, i.e., the blades 38 extend radially farther than the adjacent upper surface 33, lower surface 35, and side surfaces 37 of the shaft housing 32 and therefore cut a swath larger than the adjacent end of the shaft housing 32. The preferred bits 30 are not twist-drill type bits, i.e., the bits 30 are not self-propelling and will not pull themselves into a tree as they are rotated, but must be forced or driven through the trees and forestry being cut by a propulsion source 40 (FIG. 1A) which is connected to the shafts 24 or shaft housing 32. It is contemplated that the non-self-propelling bits will have at least two advantages: (1) they will allow the operator to see or feel the bits beginning to bind; and (2) they will allow the operator to withdraw the bits at will, even while the bits are rotating, as necessary or desirable to avoid binding of the bits and consequent damage to the apparatus 20. The preferred bit 30 has two radially extending cutting blades 38 which extend approximately diametrically from the bit 30. The cutting blades are appropriately sharpened for proper cutting and include an initiation point blade 42 for initiating and guiding the cut of the bit into a tree.

The blades 38 are preferably made of high carbon steel and may be inserts which are replaceably connected to the bits 30. In the preferred bits 30, the blades 38 are welded to a mounting barrel 44. The mounting barrel 44 is sized to fit over the first end 26 of the shafts 24. The first end 26 of the shafts 24 may be machined square with the inside of the mounting barrel 44 also of square shape in order to fix the rotational orientation of the mounting barrel 44 on the shafts 24. The first end 26 of the shafts 24 and the interior of the mounting barrel 44 may take virtually any complementary shapes which will fix the rotational orientation of the mounting barrel 44 on the shafts 24.

In the contemplated prototype apparatus, as exemplified in FIGS. 3 and 4, the first end 26 of the shafts 24 are substantially circular in cross-sectional diameter and the mounting barrel 44 includes a keyway 46 milled on the inside surface of the barrel 44 which engages a catch or key 48 on the first end 26 of the shaft 24 for properly rotationally orienting the bit 30 and cutting blades 38 on the shaft 24. In the preferred apparatus 20, the bits 30 are about transversely aligned and adjacent bits 30 are keyed so that the rotational paths of the cutting blades 38 overlap without contact being made between the adjacent blades 38 during rotation. Preferably, the bits 30 are keyed to the shafts 24 so that the blades 38 of adjacent bits 30 rotate 90 degrees out-of-phase with one another, as best seen in FIG. 4. A bolt 50 (which may also be a pin, screw, allen-head screw or other appropriate fastening device) is provided for detachably attaching the bits 30 to the first ends 26 of the shafts 24. Therefore, the bits 30 may easily be replaced in the field in a manner which requires little down time of the apparatus.

Figure 2B:
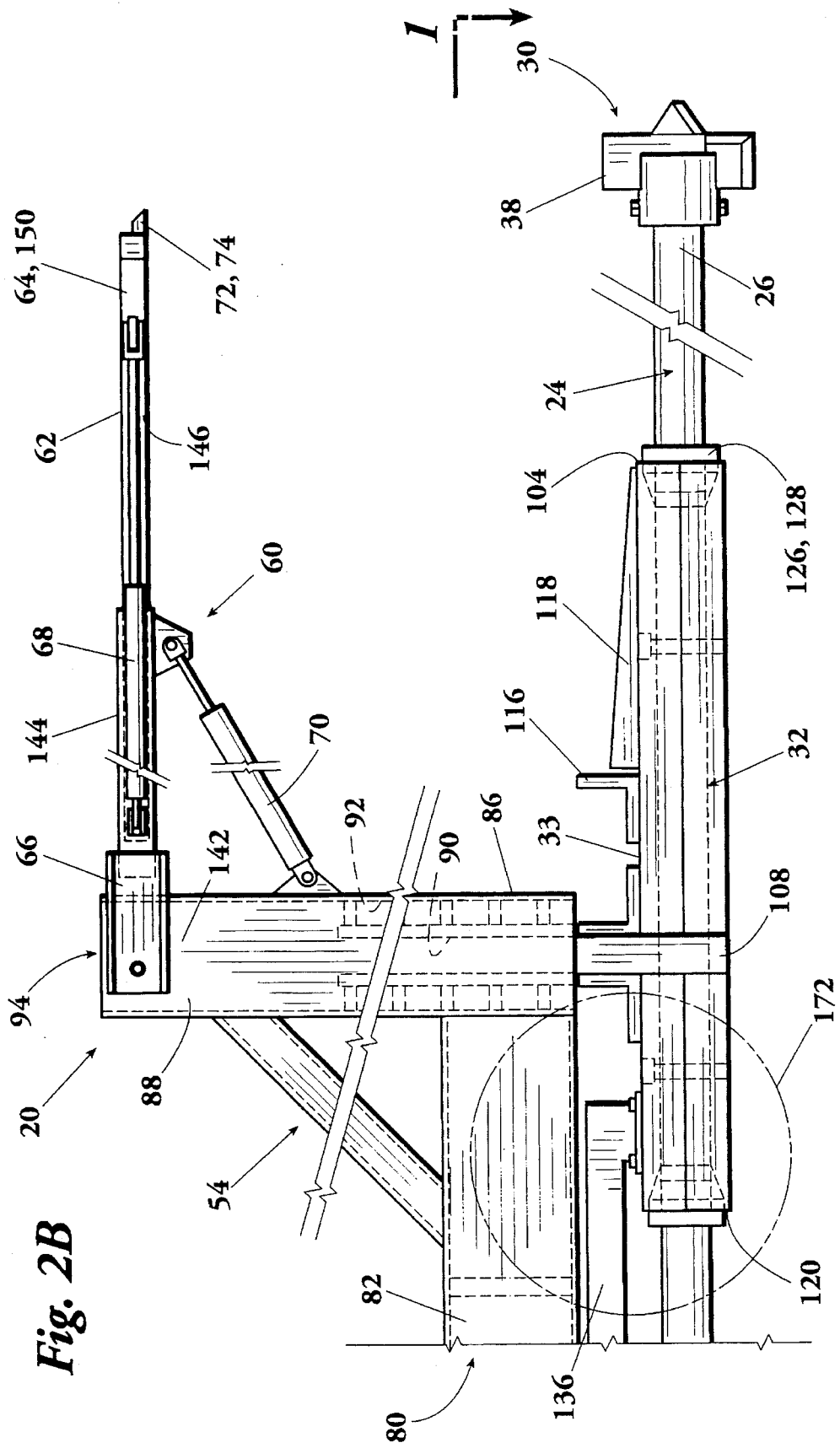

Referring to the example of FIGS. 1B and 2B, the apparatus 20 includes a frame 54 connected to the shaft housing 32 for supporting the shaft housing 32. A vertical actuator 56 (FIG. 5) is connected between the frame 54 and shaft housing 32 for selectably adjusting the elevation of the shaft housing 32 and shafts 24. Since the cutting blades 38 extend radially farther than the surfaces 33, 35, 37 of the shaft housing 32, when the elevation of the shaft housing 32 is selected such that the shaft housing 32 is contacting or near the ground, the swath cut by the cutting bits 30 will extend below ground level, thereby removing the forestry at or below ground level in one passage of the apparatus 20 through the forestry.

Referring to example FIGS. 1A and 2A, The preferred propulsion source 40 is connected to the frame 54 for forcing the cutting bits 30 and shafts 24 through the forestry to be cut or severed; and may be any means capable of urging or propelling the shafts 24 and bits 30 through the forestry. Preferably, the propulsion source 40 is a motor-driven vehicle such as a tractor, bulldozer, truck, or the like. More preferably, the propulsion source 40 includes a power take-off 58 which provides the rotary power of the rotary power source 36. The rotary power source 36 may be any means for rotating the shafts 24 such as an electronic, hydraulic, or pneumatic motor and may be mounted on the frame 54 or on the propulsion source 40.

Referring to the example of FIG. 2B, the preferred apparatus 20 includes a deflector 60. The deflector 60 is connected to the frame 54 and extends towards the first end 26 of the shafts 24 for contacting forestry being cut by the bits 30 and deflecting the forestry away from the apparatus 20 as the bits 30 cut through the forestry. The deflector 60 exerts a constant pressure against the forestry which places the wood fibers of the forestry in tension making the forestry easier to cut. Further, the constant pressure exerted against the forestry by the deflector 60 eliminates compressive forces in the forestry at the cutting bits 30 and prevents the forestry from placing the bits in a bind.

The preferred deflector 60 includes a telescopable support arm 62 having a first end 64 for contacting the forestry and a second end 66 connected to the frame 54. A deflector actuator 68 is connected to the support arm 62 for extending and retracting the first end 64 of the telescopable support 62 relative to the second end 66 and to the bits 30. Preferably, the second 66 of the support arm 62 is pivotably connected to the frame 54. A pivot actuator 70 is connected between the frame 54 and the support arm 62 for pivoting the support arm 62 about the second end 66 of the support arm 62 in order to raise and lower the first end 64 of the support arm 62 relative to the bits 30.

Figure 6:
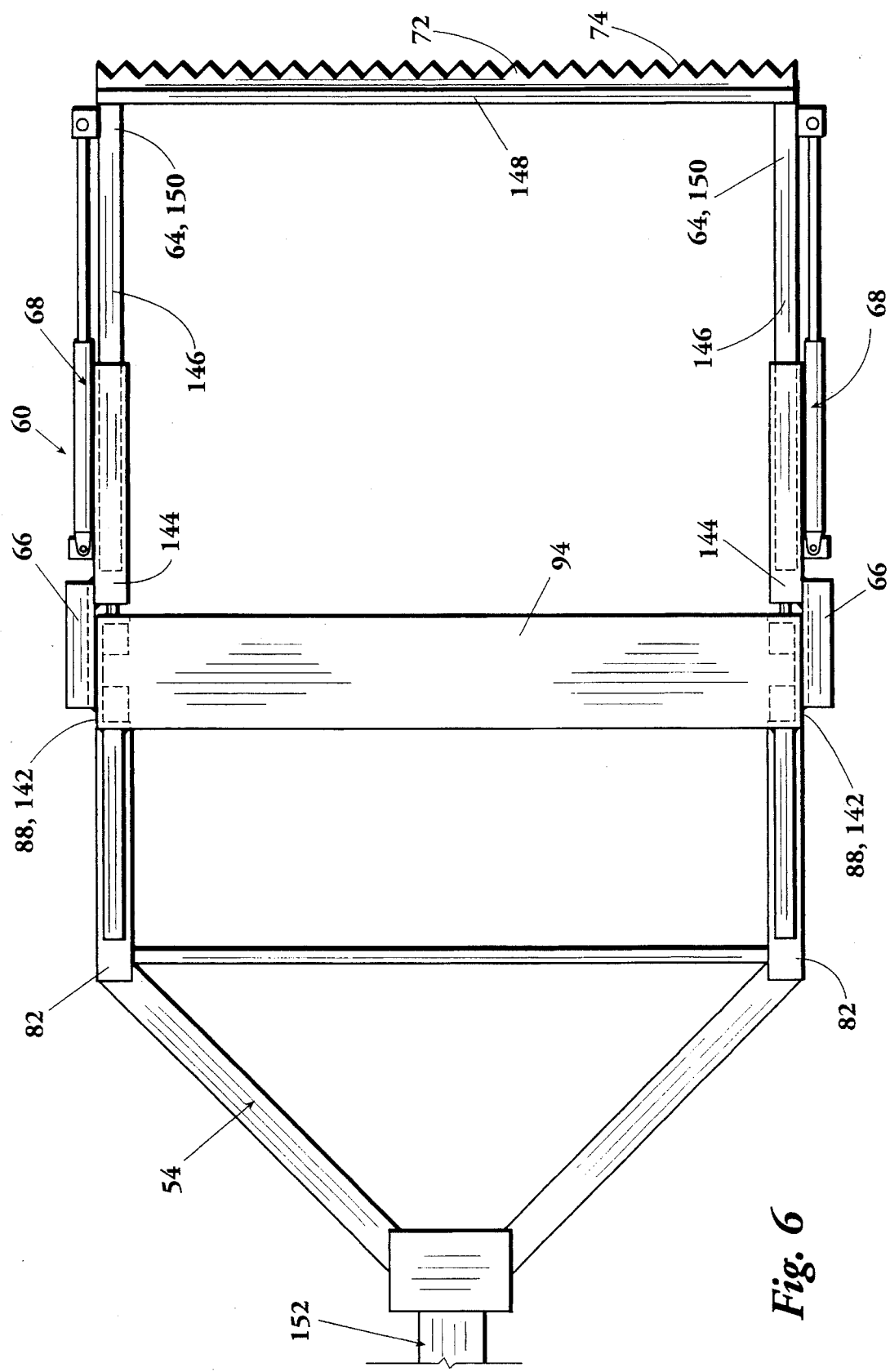
FIG. 6 is a top plan view of an embodiment of the deflector of the present invention.

More preferably, referring to example FIG. 6, the first end 64 of the support arm 62 includes a blocking member 72 which extends transversely to the axes of the shafts 24 at least as far as the outermost shafts 24. The preferred blocking member 72 includes a serrated surface 74 which is directed in the same direction as the cutting bits 30, i.e., toward the forestry, for contacting the forestry and preventing transverse motion of the forestry as it is deflected by the blocking member 72. The serrated surface 74 captures the forestry and foliage deflected by the deflector 60 and prevents the forestry from springing towards the second end 28 of the shafts 24 and the propulsion source 40 in order to protect any operating personnel as well as the apparatus 20. The blocking member 72 and serrated surface 74 are securely connected at the first end 64 of the support arm 62, such as by welding, bolting, or equivalent fastening.

Referring to the examples of FIGS. 1–6, a more detailed description of the structure and operation of the inventive apparatus 20 will now be provided. Although the apparatus 20 will be described as being mounted in a trailer 80 (FIG. 5) so that the apparatus 20 may be connected to a farm tractor, bulldozer, truck, or the like, it is intended to be understood that the trailer 80 may be a self-propelled vehicle having its own engine and transmission for moving and operating apparatus 20, or other means capable of supporting and moving the shafts 24 in accordance with the description herein, as would be known to one skilled in the art in view of the disclosure contained herein. It is also intended to be understood that the frame 54 and/or trailer 80 is not needed in all embodiments of the invention. For example, it is contemplated that a smaller version of the apparatus 20 comprising the rotatable shafts 24, bits 30, and shaft housing 32 may be connected to a rotary power source 36 and to a suspension system (not illustrated) such as the power takeoff and three point hookup system commonly used on farm tractors. The apparatus 20 could then be raised and lowered in the same manner as a hayfork on a farm tractor with the farm tractor being used to transport the apparatus 20 to the desired location, to provide the rotary power source for rotating the shafts, and to provide the three point hookup for lowering the apparatus 20 to ground level when it is in use and elevating it above ground level when it is transported or not in use. For purposes of this description, the term "horizontal" means generally coplanar or parallel with the axes 34 of the shafts 24, which will normally be about parallel with the surface of the ground.

Referring to example FIGS. 1A, 1B and 2B, the trailer 80 provides the frame 54 previously discussed. The trailer 80 includes two horizontal side members 82 which are joined at their first end 84 and approximately parallel and unconnected at their second ends 86. A vertical stanchion 88 is provided adjacent the second end 86 of each side member 82. The stanchions 88 are securely connected to the side members 82, such as by welding, bolting, or the like. A vertical guide 90, such as a slot, is formed in the inside surface 92 of each stanchion 88. The vertical guides 90 are formed by connecting angle iron, metal strips, or channel iron to the inside surfaces 92 of the stanchions 88. A structural cross-member 94 (FIG. 6) is connected between the upper ends of the stanchions 88 to give the trailer 80 or frame 54 lateral strength. A vertical actuator 56 (FIG. 5) is connected between the cross-member 94 and the shaft housing 32 adjacent each stanchion 88 (i.e., there are two vertical actuators 56, one adjacent each stanchion 88). The actuators 56 are extended and retracted to adjust to the elevation of the shaft housing 32. The preferred side members 82, stanchions 88 and cross-member 94 are made of channel-shaped structural iron.

Figure 5:
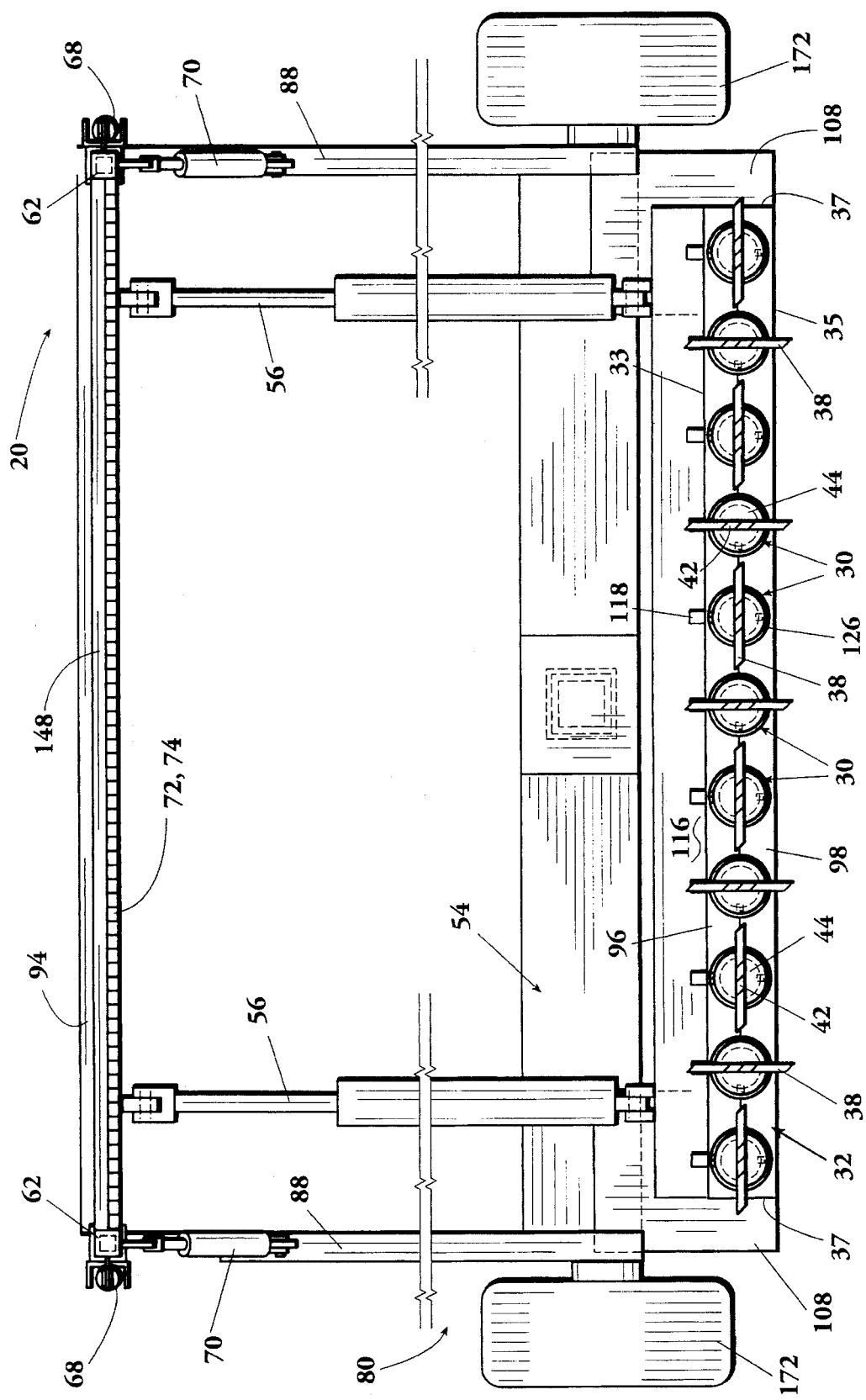
FIG. 5 is a rear elevation view of an embodiment of the apparatus of the present invention.

Referring to FIG. 5, the shaft housing 32 may be any structure having means for rotatably supporting the shafts 24 and bearing the forces created by the bits 30 during cutting operations. The preferred shaft housing 32 is made of two heavy steel plates 96, 98. A series of semicircular grooves is formed in one surface of each of the plates and the plates are joined so that the semicircular grooves coincide and create open bores 102 which extend through the plates and shaft housing 32, as illustrated in FIG. 1B. The plates 96, 98 are preferably detachably joined by bolts, screws, or equivalent fasteners. The shafts 24 extend through the bores 102 in the shaft housing 32 and the first end 26 of the shafts 24 extend beyond the first end 104 of the shaft housing. Appropriate rotating and thrust bearings, collars, keys, seals, etc. are provided in the shaft housing 32 between the shafts 24 and housing 32 as necessary to rotatably support and hold the shafts 24 in place in the shaft housing 32, as would be known to one skilled in the art in view of the disclosure contained herein.

The shaft housing 32 has two sides 37 and is located inside the frame with one side 37 of the shaft housing 32 adjacent each side member 82 of the trailer 80. A guide follower 108 is connected on each side 37 of the shaft housing for movably engaging the vertical guides 90 with the inside surfaces 92 of the stanchions 88. Preferably, the guide followers 108 are detachably fastened by angle iron to the uppermost plate 96 of the shaft housing 32. As the vertical actuators 56 extend and retract the guide followers 108 slide up and down in the vertical guides 90. The guide followers 108 should be axially positioned on the shaft housing 32 such that the weight of the shafts 24, shaft housing 32 and other components connected to the shafts are approximately balanced on either axial side of the guide followers 108. The guide followers 108 should have sufficient vertical length that the shaft housing 32 can be lowered below ground level with enough of the guide followers 108 remaining in the vertical guides 90 to keep the shaft housing 32 in proper position and stable during cutting. Multiple parallel vertical guides 90 and corresponding guide followers 108 may be provided on each side 37 of the shaft housing 32 and/or the vertical guides 90 and guide followers 108 may be replaced by tracks and rollers, captured slides, captured rollers, or the like as necessary to provide additional stability during cutting.

Referring to FIG. 2B, the shaft housing 32 should have sufficient axial dimension between the guide followers 108 and the first end 104 of the shaft housing 32 that the first end 104 extends well beyond the second end 86 of the trailer 80. The upper plate 96 of the shaft housing 32 has an outside upper surface 33 facing away from the shafts 24. A stop 116 is located between the first end 104 of the shaft housing and the vertical actuators 56. The stop 116 extends radially from the outside upper surface 33 farther than the cutting blades 38 extend radially from the shafts 24 in order to stop travel of the shaft housing 32 into forestry being cut. Preferably, the stop 116 is located on the outside upper surface 33 of the shaft housing 32 at a point adjacent the second end 86 of the trailer 80, but between the second end 86 of the trailer 80 and the first end 104 of the shaft housing 32. In other words, the stop 116 is located on the portion of the shaft housing 32 which extends outside the second end 86 of the trailer 80 but is adjacent the second end 86 of the trailer 80 to allow as much of the shaft housing 32 as possible to enter the swath cut by the bits 30. The preferred stop 116 is made of angle iron and extends substantially completely across the shaft housing from side to side.

In a preferred embodiment, the shaft housing 32 also includes a wedge element 118 connected to the upper surface 33. The wedge element 118 is oriented so that it increases in thickness from the first end 104 towards the second end 120 of the shaft housing 32. Preferably, the wedge element 118 is a plurality of angled iron strips which form an angle of about six degrees with the outside upper surface 33. The wedge elements 118 are spaced apart parallel to one another at about even spacings transversely across the shaft housing 32 (FIG. 1B). The preferred wedge elements 118 extend axially on the shaft housing 32 from the first end 104 of the shaft housing to the stop 116. The maximum radial extension of the wedge elements 118 from the center lines or axes 34 of the shafts 24 should be less than the radial extension of the cutting blades 38 from the center lines or axes 34 of the shafts 24. The wedge elements 118 assist the deflector 60 in biasing or urging the forestry away from the apparatus 20. Also, if a large tree begins to lean toward the propulsion source 40, it will exert force on the top of the wedge elements 118 which will restrain the propulsion source 40 as it moves the cutting bits 30 farther into the tree. This will warn the operator to withdraw the apparatus 20 and to reposition the apparatus 20 before continuing cutting of the tree. In an alternative embodiment (not illustrated) the wedge elements 118 may be disposed in slots in the housing 32 and connected to a piston-cylinder actuator or the like which may be controlled by the operator to extend and/or retract the wedge elements as desired.

The shafts 24 should extend sufficiently beyond the first end 104 of the shaft housing 32 that particles of cut wood and forestry will not wedge or jam between the cutting bits 30 and the shaft housing 32. It is contemplated that in the prototype apparatus 20 the shafts 24 will extend approximately two and one-half to three feet beyond the first end 104 of the shaft housing 32 and the distance between the stop 116 and the first end 104 of the shaft housing 32 will be between one and one and one-half feet. In this contemplated prototype, the shafts 24 will be approximately one to three inches in diameter and made of high grade carbon steel, or other equivalently strong, flexible material; and the transverse dimension of the shaft housing will be approximately four feet.

Referring to FIGS. 2B and 4, in the preferred apparatus 20, in order to prevent wire, strong vines, and the like from wrapping around the shafts and damaging the bearings or seals at the first end 104 of the shaft housing 32, wire cutting caps 126 will be provided on the first end 104 of the shaft housing 32 surrounding each shaft 32. The caps 126 will each have a sharp-edged protrusion 128 extending axially from the annular cap 126 at at least two points. Preferably, the protrusions 128 will be diametrically aligned on each cap 126. As wire, vines, or the like wrap around a rotating shaft 24, the protrusions 128 will cut the wire or vines and free the apparatus 20 from entanglement. Knife-like edges (not illustrated) may be axially extended from the periphery of the first end 104 of the shaft housing 32 toward the bits 30 in order to trim any portions of the forestry not cut by the bits 30 (such as may occur outside the overlapping diameters of the blades 38) and to facilitate movement of the first end 104 of the housing 32 into the swath cut by bits 30.

Referring to the example of FIG. 1B, in the contemplated prototype apparatus 20, the shafts 24 also extend axially from the second end 120 of the shaft housing 32. The rotary power source 36 includes a plurality of gears 130. A gear 130 is connected to each shaft 24 in such a manner that the gears 130 of adjacent shafts intermesh and rotate adjacent shafts 24 in opposite directions, i.e., clockwise and counterclockwise. It is desirable that the shafts 24 and bits 30 rotate in opposite directions to prevent the shafts 24 and bits 30 from walking or creeping to one side or the other as the bits 30 bore through forestry. This will assist the apparatus 20 in staying in proper alignment. The preferred gears 130 are spur gears. More preferably, the spur gears are relatively long in axially dimension to reduce wear and prolong the life of the gears 130. The second end 28 of at least one shaft 24 will extend into connection with a rotary power source 36, such as the power takeoff 58 previously discussed.

In the contemplated prototype apparatus 20, a secondary shaft housing 132 is provided at the second end 28 of the shafts 24. The secondary shaft housing is constructed of two matching plates, similar to the shaft housing 32, excepting that only one bore 134 and shaft 24 pass axially through the secondary shaft housing 132. The remainder of the bores 134 and shafts 24 terminate in the secondary shaft housing 132 and thrust bearings are provided in the secondary shaft housing to both rotationally support and enable the shafts 24 to be forced into forestry by the propulsion source 40. Preferably, the shaft 24 which extends through the secondary shaft housing 32 will be one of the shafts 24 nearer the transverse center of the apparatus 20.

Cross braces 136 which extend between the secondary shaft housing 132 and shaft housing 32 are provided to stabilize the housing 32, 132 and transfer forces between them. In the contemplated prototype apparatus, four cross braces 136 are evenly transversely spaced on the upper plates of the housings 32, 132. There should be sufficient axial distance between the housings 32, 132 to allow flexing of the shafts 24 in order to reduce the possibility of the shafts 24 binding in the housings 32, 132 as the shafts 24 receive the compressive loadings created as the apparatus 20 cuts through forestry. It is also contemplated that the secondary housing 132 will not be necessary in smaller sizes of the apparatus 20. Vertical stanchions with vertical guides, guide followers, and vertical actuators, similar to the vertical stanchions 88, vertical guides 90, and vertical actuators 56 previously discussed, may be provided on the trailer side members 82 at the secondary shaft housing 132 if necessary to provide additional stability for the apparatus 20.

Referring to the example of FIGS. 2B, 5 and 6, in the contemplated prototype apparatus 20, the second end 66 of the deflector support arm 62 is pivotally connected to the outside surface 142 of the vertical stanchion 88 such that the support arm 62 pivots about a substantially horizontal axis. The pivot actuator 70 is connected between the vertical stanchion 88 and a portion of the support arm 62 which is connected to the stanchion 88 and does not telescopically extend and retract. The preferred pivot actuator 70 is positioned and sized such that it may be extended and retracted to selectably pivot the deflector support arm 62 between a substantially horizontal position when the pivot actuator 70 is fully retracted and a position approximately 30 to 40 degrees above horizontal when the pivot actuator 70 is fully extended.

The preferred telescoping support arm 62 includes a section of outer square tubing 144 which is pivotally connected to the stanchion and a section of inner square tubing 146 which telescopically extends and retracts inside the outer square tubing 144. The deflector actuator 68 has one end connected to the outer square tubing 144 and a second end connected to the inner square tubing 146 so that the actuator 68 may be extended and retracted in order to telescopically extend and retract the inner square tubing. As may be seen in FIGS. 5 and 6, an identical telescopable support arm 62, deflector actuator 68, and pivot actuator 70 are provided on the outside surface 142 of each of the two vertical stanchions 88. The blocking member 72 includes a structurally supporting cross member 148 which is connected between the outside ends 150 of the inner square tubing 146 and to which the serrated surface 74 is securely connected.

Referring to the example of FIGS. 1A and 2A, the apparatus 20 includes a telescopable neck 152 connected to the frame 54 for connecting the frame 54 to a relatively fixed object 154, such as a parked motor vehicle or equivalent stationary device, and a drive actuator 154 connected to the neck 152 for selectably extending and retracting the neck 152 and frame 54 in a direction coincident with the axes 34 of the shafts 24. In the contemplated prototype apparatus, the telescopable neck 152 has a first end 156 connected to the first end 84 of the trailer 80 and a second end 158 extending axially away from the trailer 80. A trailer hitch 160 or similar fastening device for securely connecting the neck 152 to a motor vehicle or other relatively fixed object is provided at the second end 158 of the neck 152.

The first end 156 of the neck 152 includes a section of square outer tubing which is securely fixed to the first end 84 of the trailer 80 and the second end 158 includes a section of square inner tubing which is telescopably engaged inside the outer square tubing 162. The drive actuator 154 is connected between the inner and outer tubing for extending and retracting the tubing and neck 152. As exemplified in FIG. 1A, in the contemplated prototype apparatus, identical actuators 154 are provided on opposite sides of the neck 152. The drive actuator 154 and telescopable neck 152 may be used to extend the cutting bits 30 away from the motor vehicle or other propulsion source 40 for safety reasons and may also be used as a propulsion source to force the cutting bits 30 through forestry to be cut.

Referring to FIG. 5, the trailer 80 is provided with wheels and tires 172 on each side member 82 of the trailer 80. The wheels and tires are appropriately sized and positioned for the size and construction of the apparatus 20. In the contemplated prototype apparatus 20, the wheels 172 are independently mounted on opposite side members 82, i.e., there is no axle which extends transversely across the trailer in order to avoid interference with the vertical travel of the shaft housing 32 and shafts 24.

The actuators 56, 68, 70, 154, may be hydraulically or pneumatically actuated piston-cylinder actuators, electrically operated rack and spur gears, or other linearly extendable and retractable devices. Appropriate control lines will be provided so that the actuators and rotation of the shafts 24 may be controlled from the motor vehicle or propulsion source 40. Additional actuators may be provided to cause the trailer 80 to tilt forward, backward, and side-to-side in order to allow proper positioning on uneven terrain.

It is further contemplated that the prototype apparatus 20 will be designed for operation with farm tractors. Therefore, referring to FIG. 2A, a reduction gear box 174 will be provided in the upper drive shaft 176 from the power take off 58 in order to reduce the speed of rotation of the shafts 24 and bits 30 to approximately 200 RPM. It is contemplated that the drive shaft 176 will be telescopically connected to the power take off 58 and will be provided with a first universal joint 178. An intermediate shaft 180 will connect the reduction gear box to a spur gear box 182 which will be telescopically connected via lower drive shaft 186 to the second end 28 of the shaft 24 which extends through the secondary shaft housing 132. This arrangement will allow the shaft housings 32, 132 and shafts 24 to be elevated to an inactive position which is protected by the trailer members 82, 88 during transportation. Such an arrangement would be designed to allow the shafts 24 to be elevated at least about 30 degrees above and 30 degrees below the level of the second universal joint 184. A third universal joint (not illustrated) may be provided in the lower drive shaft 186 to allow the shafts 24 to be raised and lowered in a substantially horizontal orientation. It is further contemplated that a slip or friction clutch (not illustrated) will be provided in at least one of the drive shafts 176, 186 in order to protect the apparatus 20 if the cutting bits 30 should become jammed. It is also contemplated that a splined coupling (not illustrated) will be provided in at least one of the drive shafts 176, 186 in order to allow backward and forward movement of the drive shafts 176,186 during transportation, to allow up and down movement or elevational positioning of the shafts 24, and to protect the apparatus 20 if the power takeoff 58 and trailer become misaligned.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Apparatus for cutting trees, brush, and other forestry, comprising:

a plurality of rotatable shafts having a first end and a second end;

a plurality of cutting bits, at least one cutting bit being connected at the first end of each shaft, each cutting bit having a cutting diameter larger than the diameter of the shaft to which the bit is connected, each cutting bit comprising:

radially extending cutting blades, the blades of adjacent bits overlapping so that the bits cut a continuous, unbroken swath and sever the forestry above the shafts in one passage of the bits through the forestry;

a shaft housing connected to the shafts, for rotatably supporting the shafts with the rotational axes of the shafts juxtaposed; and a rotary power source for rotating the shafts; and wherein the cutting blades are further defined as extending radially from the shafts beyond the adjacent surfaces of the shaft housing so that the shaft housing may enter the swath cut by the bits.

2. Apparatus of claim 1 comprising:

a frame for supporting the shaft housing; and a deflector, connected to the frame and extending towards the first end of the shafts, for contacting forestry being cut by the bits and deflecting the forestry away from the apparatus as the bits cut through the forestry.

3. Apparatus of claim 2 in which the deflector comprises:

a telescopable support arm having a first end for contacting forestry and a second end connected to the frame; and a deflector actuator, connected to the support arm for extending and retracting the first end of the telescopable support arm relative to the second end of the support arm and to the bits.

4. Apparatus of claim 3 in which the first end of the support arm comprises:

a blocking member extending transversely to the axes of the shafts at least as far as the outermost shafts.

5. Apparatus of claim 4 in which the blocking member comprises:

a serrated surface, connected to and directed away from the second end of the supporting arm, for preventing transverse motion of forestry deflected by the blocking member.

6. Apparatus of claim 3 wherein the second end of the support arm is further defined as being pivotably connected to the frame, and the deflector comprises:

a pivot actuator connected between the frame and the support arm for pivoting the support arm about the second end of the support arm in order to raise and lower the first end of the support arm relative to the bits.

7. Apparatus of claim 1 in which the shaft housing includes an upper surface facing away from the shafts, a first end adjacent the first end of the shafts, a second end adjacent the second end of the shafts, and a wedge element connected to the upper surface, the wedge element being oriented to increase in thickness from the first end towards the second end of the shaft housing.

8. Apparatus of claim 1 comprising:

a propulsion source, connected to the shaft housing, for forcing the cutting bits and shafts through forestry to be cut.

9. Apparatus of claim 1, comprising:

a frame, connected to the shaft housing, for supporting the shaft housing; and a vertical actuator, connected between the frame and shaft housing, for selectably adjusting the elevation of the shaft housing and shafts.

10. Apparatus for severing trees, brush, and other forestry at or below ground level in one passage of the apparatus through the forestry, comprising:

a plurality of rotatable shafts having a first end and a second end;

a plurality of cutting bits, at least one cutting bit connected at the first end of each shaft, each cutting bit having cutting blades which extend radially beyond the outside diameter of the shaft to which the bit is connected, the blades of adjacent bits overlapping so that the bits cut a continuous, unbroken swath;

a shaft housing for rotatably supporting the shafts with the rotational axes of the shafts about parallel and coplanar and with the bits about transversely aligned; and a rotary power source, connected to the shafts, for rotating the shafts; and wherein the blades are further defined as extending radially from the shafts farther than the adjacent surfaces of the shaft housing so that the swath cut by the blades is larger than the adjacent shaft housing and the shaft housing may enter the swath cut by the bits.

11. Apparatus of claim 10, comprising:

a frame, connected to the shaft housing for supporting the shaft housing; and a propulsion source, connected to the frame, for forcing the cutting bits and shafts through forestry to be severed.

12. Apparatus of claim 11, in which the propulsion sources comprises:

a motor-driven vehicle.

13. Apparatus of claim 11 in which the propulsion source comprises:

a telescopable neck, connected to the frame, for connecting the frame to a relatively fixed object; and a drive actuator, connected to the neck, for selectably extending and retracting the neck and frame in a direction coincident with the axes of the shafts.

14. Apparatus of claim 10, comprising:

a frame, connected to the shaft housing, for supporting the shaft housing; and a vertical actuator, connected between the frame and the shaft housing, for selectably adjusting the elevation of the shaft housing from an elevation at or below ground level to an elevation above ground level.

15. Apparatus for severing trees, brush, and other forestry at or below ground level in one passage of the apparatus through the forestry, comprising:

a plurality of rotatable shafts having a first end and a second end;

a shaft housing for rotatably supporting the shafts with the rotational axes of the shafts juxtaposed and the first ends of the shafts about transversely aligned;

a plurality of cutting bits, at least one cutting bit connected at the first end of each shaft, each bit having cutting blades which extend radially farther than the adjacent surfaces of the shaft housing and which overlap with the blades of adjacent bits so that the bits cut a continuous, unbroken swath into which the shaft housing may enter;

a rotary power source, connected to the shafts, for rotating the shafts;

a frame for supporting the shaft housing; and a vertical actuator, connected between the frame and the shaft housing, for selectably adjusting the elevation of the shaft housing from an elevation at or below ground level to an elevation above ground level.

16. Apparatus of claim 15 in which the rotary power source comprises:

a plurality of gears, a gear being connected to each shaft in such a manner that adjacent gears intermesh and rotate adjacent shafts in opposite directions.

17. Apparatus of claim 15 in which the shaft housing includes an upper surface facing away from the shafts, a first end oriented towards the first ends of the shafts, and a second end oriented towards the second end of the shafts, the shaft housing comprising: a stop located between the first end of the shaft housing and the vertical actuator, the stop extending radially from the outside upper surface farther than the cutting blades extend radially from the shafts in order to stop travel of the shaft housing into forestry being cut.

* * * * *